US 8,988,066 B2

(12) United States Patent
Shao et al.

(10) Patent No.: US 8,988,066 B2
(45) Date of Patent: Mar. 24, 2015

(54) STEERING POSITION AND TORQUE SENSOR

(75) Inventors: Lingmin Shao, Ridgetown (CA); Ryan Elliott, Chatham (CA)

(73) Assignee: KSR IP Holdings LLC, Wilmington, DE (US)

(*) Notice: Subject to any disclaimer, the term of this patent is extended or adjusted under 35 U.S.C. 154(b) by 301 days.

(21) Appl. No.: 13/409,225

(22) Filed: Mar. 1, 2012

(65) Prior Publication Data

US 2012/0223700 A1  Sep. 6, 2012

Related U.S. Application Data

(60) Provisional application No. 61/448,256, filed on Mar. 2, 2011.

(51) Int. Cl.
*G01B 7/30* (2006.01)
*G01D 5/20* (2006.01)
*G01L 3/10* (2006.01)

(52) U.S. Cl.
CPC ............... *G01B 7/30* (2013.01); *G01D 5/2066* (2013.01); *G01L 3/105* (2013.01)
USPC .................................................. 324/207.16

(58) Field of Classification Search
CPC ......... G01B 7/30; G01D 5/2066; G01L 3/105
USPC ...................................... 324/207.11–207.26
See application file for complete search history.

(56) References Cited

U.S. PATENT DOCUMENTS

| 6,670,804 | B1* | 12/2003 | Glemser et al. ........... 324/207.16 |
| 7,562,591 | B2* | 7/2009 | Lee ........................... 73/862.331 |
| 2009/0079422 | A1* | 3/2009 | Lee ........................... 324/207.16 |
| 2012/0056616 | A1* | 3/2012 | May ........................... 324/207.15 |

FOREIGN PATENT DOCUMENTS

EP          2369291 A1 *  9/2011

OTHER PUBLICATIONS

International Search Report and Written Opinion dated Jun. 7, 2012 relating to PCT/IB2012/000401.

* cited by examiner

*Primary Examiner* — Tung X Nguyen
(74) *Attorney, Agent, or Firm* — Gifford, Krass, Sprinkle, Anderson & Citkowski, P.C.

(57) ABSTRACT

A sensor circuit for use with a shaft assembly rotatably mounted in a housing and having an input shaft, an output shaft and a torsion bar which connects the input and output shafts together. A CR coil mounted to the housing around the shaft assembly is energized and generates an electromagnetic field. An RX coil is mounted to and rotates with the shaft assembly and has an output connected to a power circuit to generate electrical energy when excited by the electromagnetic field from the first coil. The power circuit powers an angle sensor which transmits a signal back to the first coil representative of the angle between the input and output shafts.

10 Claims, 5 Drawing Sheets

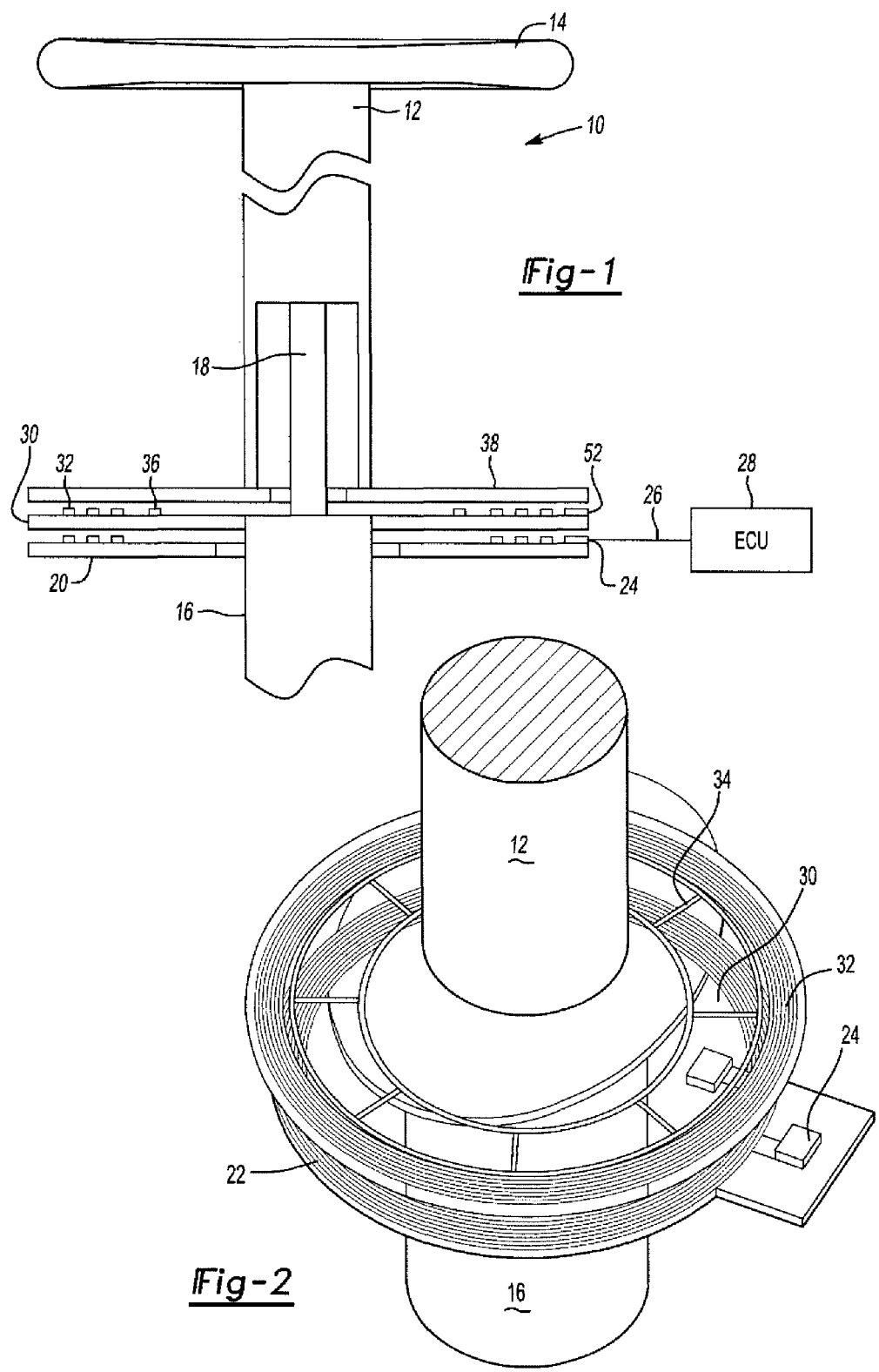

STEERING POSITION AND TORQUE SENSOR

CROSS-REFERENCE TO RELATED APPLICATIONS

This application claims priority of U.S. Provisional Patent Application 61/448,256 filed Mar. 2, 2011, the contents of which are incorporated herein by reference.

BACKGROUND OF THE INVENTION

I. Field of the Invention

The present invention relates generally to angle sensors and, more particularly, to an angle sensor between an input shaft and an output shaft.

II. Description of Related Art

In steering systems of the type used in automotive vehicles, the steering system typically includes an input shaft connected to the steering wheel. The input shaft is then connected to an output shaft through a torsion bar and the output shaft, in turn, is mechanically connected through linkage to the vehicle wheels. Consequently, rotation of the steering wheel pivots the wheels of the automotive vehicle through the torsion bar, output shaft, and steering linkage.

In many situations, it is highly desirable to determine the angular deflection between the input shaft and output shaft of the steering mechanism. The degree of angular deflection between the input shaft and output shaft, i.e. the angular deflection of the torsion bar, is utilized by the vehicle management system to determine the steering wheel torque and the amount of assist provided by the power steering. For example, rotation of the vehicle if stopped or nearly stopped, e.g. during a vehicle parking situation, typically creates a relatively high angular deflection between the input and output shaft thus calling for increased power assistance for turning the vehicle wheels. This deflection, furthermore, rarely exceeds about 20 degrees.

In addition to the angular deflection between the input shaft and output shaft of the steering, in many situations it is desirable to know the angular position of the vehicle wheels. Since the steering wheel typically can completely rotate three to four revolutions, it is necessary to keep track of the revolution count in order to determine the absolute angular position of the vehicle wheels.

There have been previously known systems which are capable of monitoring the angular deflection between the input and output shafts of the steering wheel. These previously known systems typically employ a transducer which measures the angular torque between the steering input and output shafts. However, since the steering output shaft can rotate up to three or four times, it has been necessary for the previously known devices to provide a long length of electrical cable, typically ribbon cable, within the steering column. Sufficient ribbon cable was provided so that the ribbon cable could wind around the steering column two or three times to accommodate multiple rotations of the steering wheel.

This previously known solution, however, has not proven wholly satisfactory in use. For example, it is possible for the electrical connector to become entangled after extended use which can entrap or even destroy the electrical connection between the cable and the angle sensor between the steering input and output shafts. When this occurs, the overall operation of the torque sensor for the steering system is compromised.

Similarly, there have been previously known systems which provide an output signal representative of the angular position of the vehicle wheels during multiple rotations of the steering wheel. These previously known systems, however, have proven to be unduly complex and expensive in construction.

SUMMARY OF THE PRESENT INVENTION

The present invention provides both a torque sensor and a wheel position sensor which overcome the above-mentioned disadvantages of the previously known devices.

In brief, in the present invention a combination transmitter/receiver coil is coaxially mounted around the vehicle steering column which includes both the input shaft, output shaft, and the torsion bar which connects the input shaft and output shaft together. This transmitter/receiver coil, furthermore, is stationary relative to the vehicle and thus relative to the steering column.

Preferably, the transmitter/receiver coil comprises a PCB having a conductive trace which forms a coiled loop coaxial with the steering column. An electronic circuit, such as an ASIC, is electrically connected to the transmitter/receiver coil. This receiver coil, in turn, is electrically connected to the engine control unit (ECU) which controls the overall operation of the vehicle.

A floating PCB containing both an RX coil and a receiving coil is then coaxially mounted to the output shaft so that the second PCB rotates in unison with the second output shaft. The RX coil is circular in configuration. However, the receiving coil includes at least two oppositely wound receiving coils, and more preferably eight or so oppositely wound receiving coils, that are also coaxially disposed around the output shaft. Since both the RX coil and receiving coil are formed on the second PCB and the second PCB is connected to the output shaft, both the receiving coil and RX coil rotate in unison with the output shaft. Both the RX coil and receiving coil, furthermore, are coupled to an electronic circuit, such as an ASIC, also mounted to the second PCB.

An electrically conductive multi lobe coupler is mounted to the input shaft so that the inductive coupler overlies the receiving coil on the floating PCB attached to the output shaft. The angle between the coupler and the receiving coil represents the torque angle between the input and output shafts.

In operation, the transmitter/receiver coil on the fixed PCB is energized at a high frequency, e.g. 2-4 megahertz. The electromagnetic energy generated by the transmitter/receiver coil in turn energizes the RX coil on the floating PCB which electrically powers the circuit on the floating PCB. The floating PCB also contains circuitry, such as an ASIC, to determine the angular position between the input shaft and output shaft as a function of the voltage on the receiving coil.

The second circuit then generates a digital output signal at a predefined baud rate modulated by the same frequency as the transmission frequency on the transmitter/receiver coil on the fixed PCB. The circuitry on the fixed PCB demodulates the signal from the floating PCB to provide the desired information to the vehicle ECU.

Although the torque sensor, i.e. the angle between the input and output shafts, is preferably detected by an inductive sensor, other types of sensors, such as a Hall sensor, may alternatively be used.

Since the circuit on the floating PCB board is completely powered by the electromagnetic transmission from the fixed PCB and the data is also communicated by the electromagnetic transmission between the fixed and floating PCBs, the previously known requirement of an extra long electrical connector to allow multiple rotation of the steering column is completely avoided. Instead, the only electrical connection utilized by the present invention is the electrical connection from the fixed PCB.

In order to determine the actual angular position of the wheels, a first gear wheel is preferably mounted to either the input shaft or output shaft so that the gear wheel rotates in unison with either the input or output shaft. This gear wheel, in turn, meshes with a second gear wheel having a different number of teeth. Consequently, the first and second gear wheels rotate at different rotational speeds.

A position sensor is associated with each of the gear wheels so that the angular position of both gear wheels can be determined at any time. However, since the gear wheels rotate at different rotational speeds, the actual angular position of the first gear wheel, and thus the angular position of the vehicle wheels, may be precisely determined by sensors up to multiple rotations of the steering input and output shafts.

BRIEF DESCRIPTION OF THE DRAWINGS

A better understanding of the present invention will be had by reference to the following detailed description when read in conjunction with the accompanying drawing, wherein like reference characters refer to like parts throughout the several views and in which:

FIG. 1 is a side diagrammatic view illustrating a preferred embodiment of the invention;

FIG. 2 is an elevational view thereof;

DETAILED DESCRIPTION OF THE INVENTION

Figure 3:
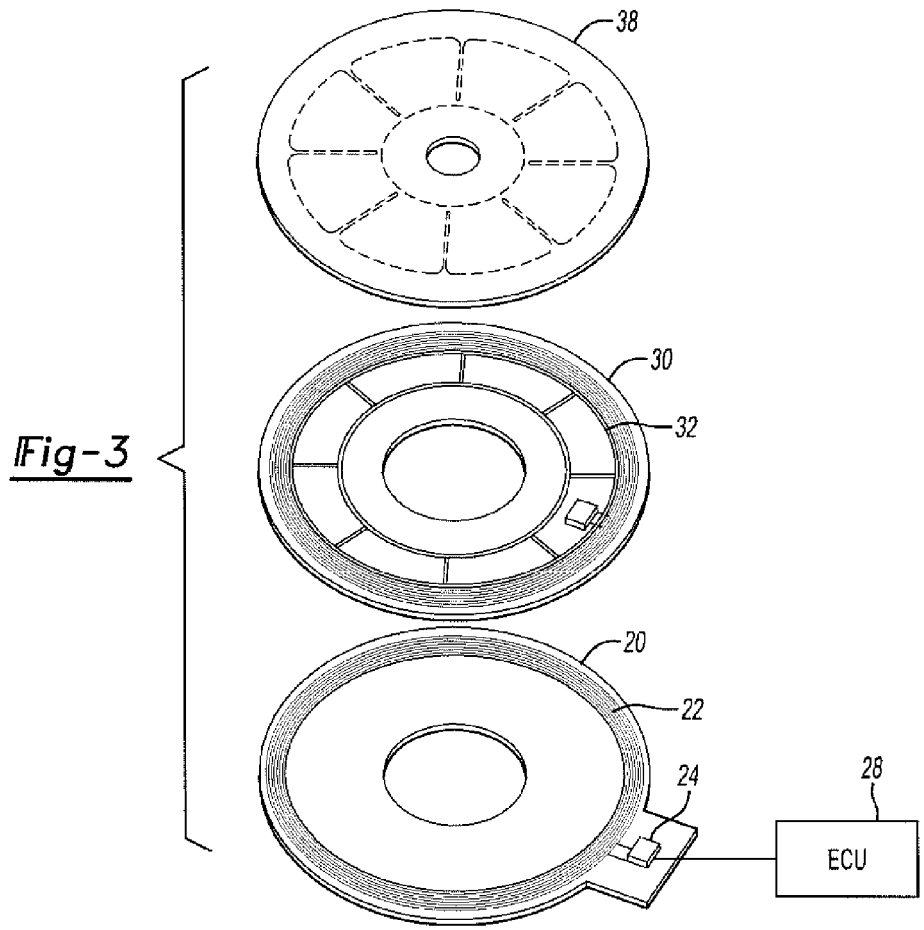
FIG. 3 is an exploded view of the preferred embodiment.

With reference first to FIGS. 1-3, a steering column 10 of the type used in automotive vehicles is illustrated. The steering column 10 includes an input shaft 12 mechanically connected to a steering wheel 14 and an output shaft 16 which is mechanically connected by a linkage (not shown) to the vehicle wheels.

The input shaft 12 and output shaft 16 are axially aligned with each other and are mechanically connected together by a torsion bar 18. The torsion bar 18 allows the input shaft 12 to rotate slightly relative to the output shaft 16 as a function of the amount of torque applied to the steering wheel 14. The amount of rotation of the input shaft 12 relative to the output shaft 16, however, is relatively small, typically not more than 20 degrees.

Still referring to FIGS. 1-3, a fixed printed circuit board (PCB) 20 is coaxially mounted around the steering column 12, preferably adjacent one end of the torsion bar 18. This fixed PCB 20, furthermore, is fixed relative to the vehicle itself and, thus, does not move relative to the steering column 10.

A circular transmitter/receiver CR coil 22 is formed on the fixed printed circuit board 20 so that the CR coil 22 is coaxial with the steering column 10. The CR coil 22 is coupled to an electronic circuit 24, such as an ASIC, which, in turn, is electrically connected by a cable 26 to the electronic control unit 28 for the vehicle.

Still referring to FIGS. 1-3, a floating PCB 30 is connected to the output shaft 16 so that the floating PCB 30 rotates in unison with the output shaft 16. A circularly wound RX coil 32 is formed by conductive traces on the PCB board at a position such that the CR coil 22 on the fixed PCB 20 inductively couples, when activated, with the RX coil 32 on the floating PCB 30. Preferably, the coils 22 and 32 are coaxially aligned with each other. A receiving coil 34 having at least two oppositely wound loops 36 (FIG. 2) is also formed by conductive traces on the floating PCB 30.

An electrically conductive coupler 38 is attached to the input shaft 12 so that the coupler 38 rotates in unison with the input shaft 12. This coupler 38, furthermore, may take any of several shapes, such as a multi lobe shape as shown in FIG. 3. Since the coupler 38 is attached to the input shaft 12 and the floating PCB 30 attached to the output shaft 16, the relative angle between the coupler 38 and the floating PCB 30 is proportional to the amount of torque applied to the steering wheel 14.

With reference now to FIGS. 1-4, the ASIC 24 on the fixed PCB 20 includes an oscillator 50 which oscillates at a high frequency, e.g. 2-4 megahertz. This oscillator 50 is electrically connected to and thus excites the CR coil 22 on the fixed PCB 20.

The signal generated by the CR coil 22 is inductively coupled to the RX coil 32 on the floating PCB 30. The RX coil 32, furthermore, is electrically connected to an ASIC 52 which, through a power regulator 54, converts the incident electromagnetic radiation from the CR coil 22 to electrical power sufficient to power the ASIC 52 on the floating PCB 30. Consequently, no external power lines are required to power the second ASIC 52.

The receiving coil 36 on the floating PCB 30 is also electrically connected as an input signal to the second ASIC 52. Since the receiving coil includes an even number of oppositely wound loops 36 (FIG. 3), the voltage on the receiving coil 36 varies as a function of the rotational position of the coupler 38 relative to the floating PCB 30. For example, a zero voltage on the receiving coil 32 would be indicative of a zero deflection between the input shaft 12 and output shaft 16 of the steering column 10, while a positive voltage would be indicative of torque in one direction between the input shaft 12 and output shaft 16, and a negative voltage would be an indication of torque in the opposite rotational direction between the input shaft 12 and output shaft 16.

Figure 4:
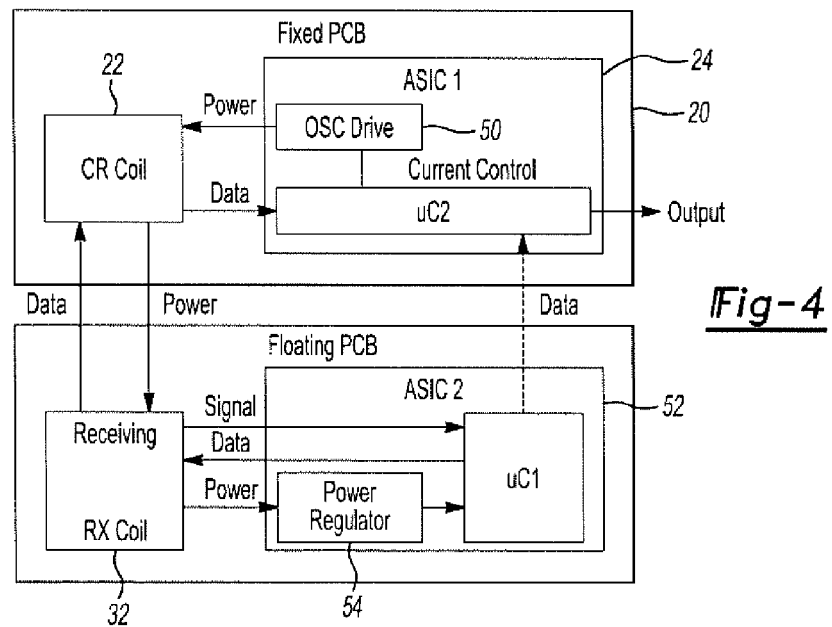
FIG. 4 is a block diagrammatic view illustrating the operation of the invention.
Figure 5:
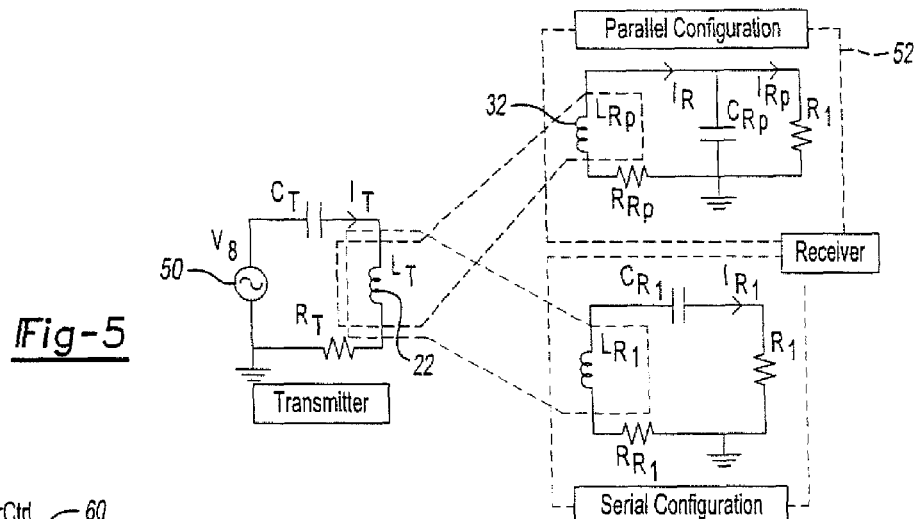
FIG. 5 is a schematic view illustrating the operation of the present invention.

With reference now to FIG. 5, one scheme, i.e. the Jordi Sacristan-Riquelme system, is illustrated for powering the second ASIC 52 by the transmission of electromagnetic radiation from the CR coil 22 on the fixed PCB 20. Although the circuitry illustrated in FIG. 4 is self-explanatory, in brief the oscillator 50 on the first ASIC 24 energizes an LC circuit at its resonant frequency to generate the electromagnetic radiation. That radiation is detected by an LC circuit including the RX coil 32, to power the second ASIC 52.

Figure 6:
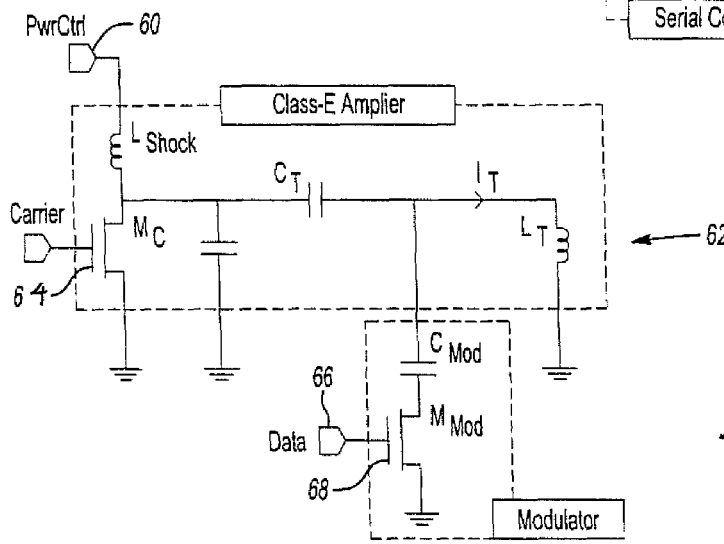
FIG. 6 is a schematic view illustrating a preferred embodiment of a modulation circuit.

With reference now to FIG. 6, the second ASIC 52 is programmed to generate a fixed digital signal back to the fixed PCB board 20 at a predefined baud rate, e.g. 50,000 Hz. For example, as shown in FIG. 6, the power from the power circuit illustrated in FIG. 4 is coupled at port 60 in order to power a modulation circuit 62. A switch 64 is opened and closed at the same frequency as the oscillator 50 to selectively power an RC network. A data input port 66, however, controls a second switch 68 at the modulation frequency, e.g. 50K, to selectively ground the capacitor Cmod in the RC network. This, in turn, causes a change in amplitude received by the transmitter/receiver CR coil 22 on the fixed PCB 20.

Figure 10:
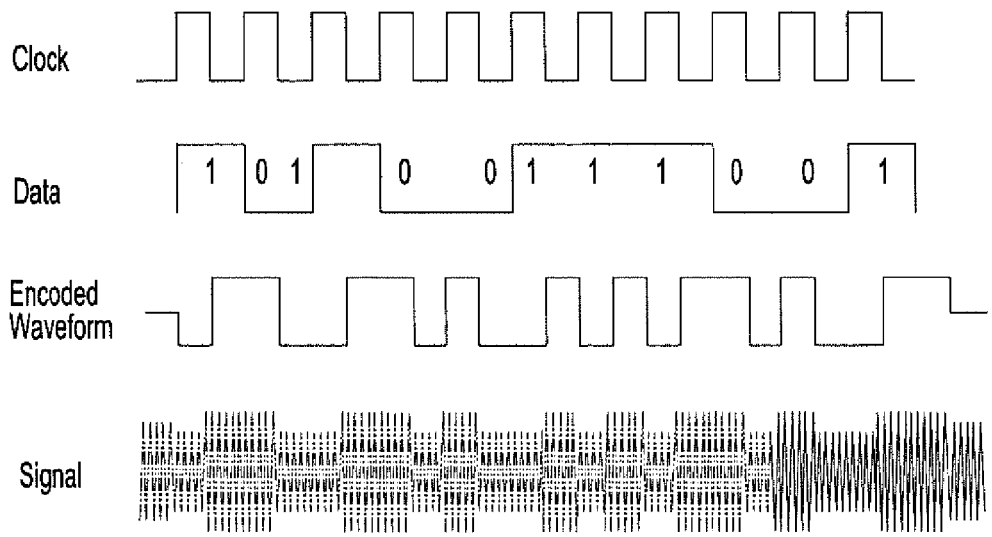
FIG. 10 is a graph illustrating the signal received by the fixed PCB from the floating PCB for a digital signal.

As shown in FIG. 10, when the output of ASIC 52 is digital, the data is sent back to the fixed PCB the same way as RFID. The sequence of the binary data is encoded to a waveform per IEEE802.3, the rising edge representing "1", the falling edge representing "0". The waveform is then amplitude-modulated to the signal through the circuit shown in FIG. 6. ASIC 24 decodes the data in a reversed order, i.e. it demodulates the signal to an encoded waveform using the circuit shown in FIG. 7, then decodes the waveform to the binary data sequence.

Figure 11:
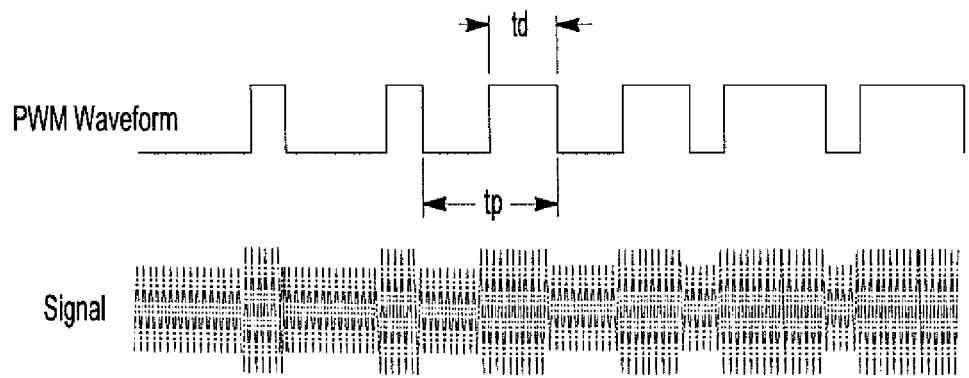
FIG. 11 is a graph illustrating the signal received by the fixed PCB from the floating PCB for an analog signal.

As shown in FIG. 11, when the output of ASIC 52 is analog, the result is converted to PWM waveform first, where the duty cycle (td/tp shown in the figure) represents the torsion angle. For example, 50% duty cycle indicates no torsion angle between the input and output shaft. Less than 50% duty cycle indicates the torsion angle in one direction, greater than 50% duty cycle indicates the torsion angle in the other direction. The PWM waveform is then amplitude-modulated to the signal through the circuit shown in FIG. 6. ASIC 24 demodulates the signal to PWM waveform using the circuit shown in FIG. 7 for further signal processing.

The circuit may contain a processor programmed to output the magnitude and direction of the angle between the input and output shafts.

Figure 7:
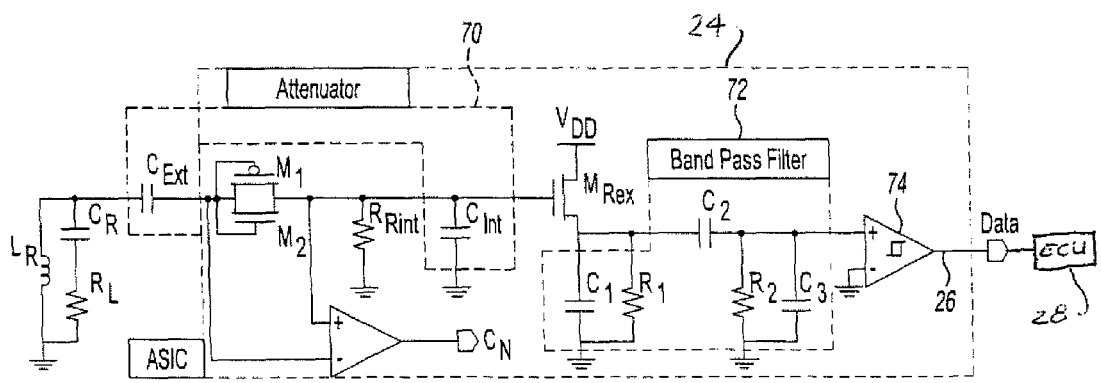
FIG. 7 is schematic view of a portion of the fixed PCB.

With reference now to FIG. 7, the ASIC 24 on the fixed PCB board receives the signal on the CR coil 22 via an attenuator 70 and then couples the signal through a band pass filter 72 and amplifier 74 as a data output signal on line 26 to the ECU 28.

When both the torque sensor and the angle sensor on the first gear wheel use an inductive sensor, they can share the same transmitter and the same conductive coupler. Such arrangement saves components and completely eliminates the possible interference between those two sensors.

From the foregoing, it can be seen that the present invention provides an effective torque sensor for two rotating elements that are connected together by a torsion bar, such as a steering column in an automotive vehicle. Since the rotating portion of the sensor, i.e. the floating PCB, is completely powered by incident radiation from the fixed PCB 20, the use of extraneous wires to power the ASIC 52 on the floating PCB 30 is rendered unnecessary.

It will also be understood that, even though the sensor for the relative angle between the input shaft 12 and the output shaft 16 has been described as an inductive sensor, other sensors may be used without deviation from the spirit of the invention. For example, Hall effect sensors may alternatively be used to detect the angle between the input shaft 12 and the output shaft 16. Still other types of sensors may also alternatively be used.

Figure 8:
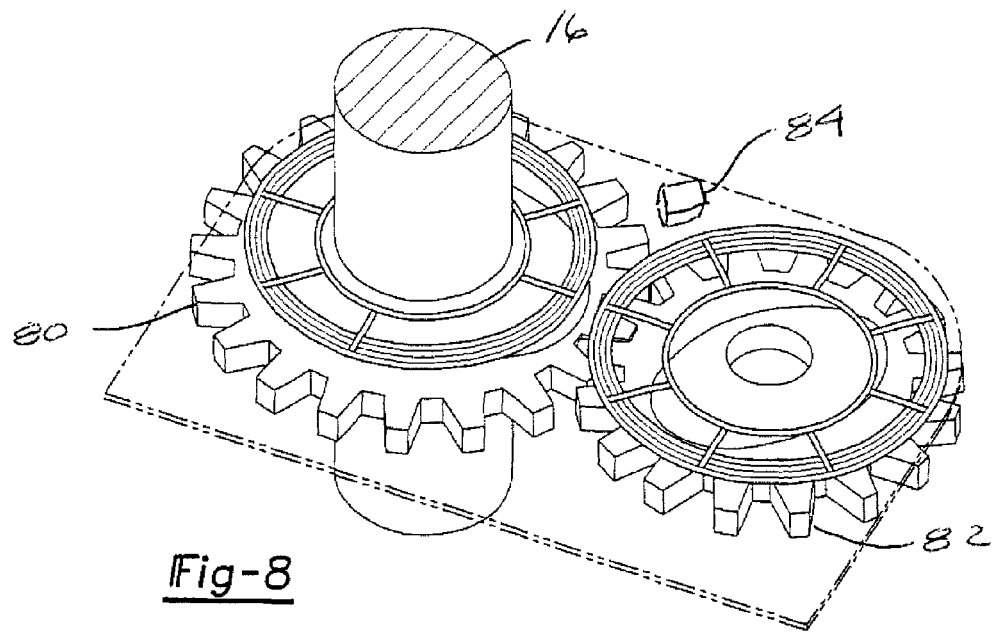
FIG. 8 is an elevational view illustrating a portion of the preferred embodiment of the wheel position sensor.

With reference now to FIG. 8, in many applications, such as an automotive steering column, the output shaft 16 may rotate a number of revolutions. In order to determine the actual angular position of the vehicle wheels, it is necessary to not only know the instantaneous angular position of the output shaft 16, but also the number of rotations of the output shaft 16 from a known position.

In order to determine the number of rotations of the output shaft 16, a first pinion 80 is attached to the output shaft 16 (or input shaft 12) so that the pinion 80 rotates in unison with the output shaft 16. This pinion 80, furthermore, has a known predetermined number of teeth.

The first pinion 80 meshes with a second pinion 82 that is rotatable about a fixed axis in the vehicle. The second pinion 82, however, has a different number of teeth from the first pinion 80 so that the pinions 80 and 82 rotate at different rotational speeds.

Figure 9:
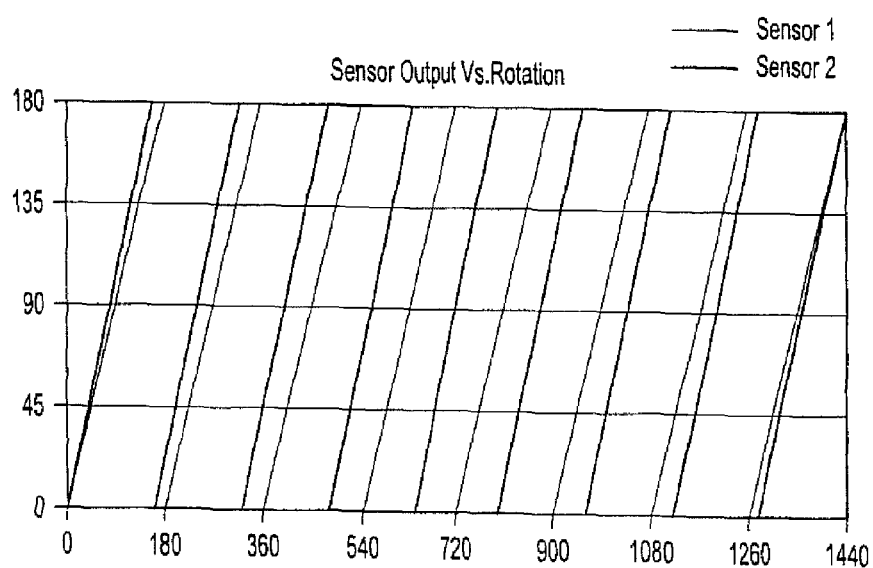
FIG. 9 is a graph illustrating the operation of the wheel position sensor.

As best shown in FIG. 9, the actual angular positions of the two pinions 80 and 82 are shown over a plurality of rotations, for example four rotations. As shown in FIG. 8, the actual angular positions of both pinions 80 and 82 are only the same at a predetermined number of full revolutions of the output shaft 16.

A sensor 84, which may be any kind of conventional sensor, is operatively coupled with both pinions 80 and 82 so that the sensor 84 can determine the rotational position of both pinions 80 and 82 at any time. Given the positions of the sensors 80 and 82 at any given time, the actual rotational position and number of rotations of the output shaft 16 can be determined from the chart shown in FIG. 8 as programmed by an appropriate processor.

Consequently, with both the torque sensor illustrated in FIGS. 1-6, and the position illustrated in FIGS. 7-8, all desired information from the steering system of an automotive vehicle may be determined for use by the engine ECU.

Having described my invention, many modifications thereto will become apparent to those skilled in the art without deviation from the spirit or scope of the appended claims.

We claim:

1. A sensor circuit for use in conjunction with a rotating shaft assembly mounted in a housing, the shaft assembly having an input shaft, an output shaft and a torsion bar connecting the input shaft to the output shaft, comprising:
   a CR coil mounted to the housing and disposed annularly around the shaft assembly, said CR coil continuously generating an electromagnetic field when excited by a frequency source,
   an RX coil mounted to and around one of the input shaft and the output shaft, said RX coil connected to a power circuit to generate power solely from said electromagnetic field from said CR coil when said RX coil is excited by the electromagnetic field from the CR coil,
   an angle sensor powered by said power circuit and mounted to one of said input shaft and said output shaft, said angle sensor generating a wireless output signal to said CR coil representative of the angle between the input shaft and the output shaft,
   a sensor output circuit which receives the output signal on said CR coil and generates a sensor signal representative of the angle between the input shaft and the output shaft.

2. The sensor circuit as defined in claim 1 wherein said angle sensor comprises:
   a receiving coil having at least two oppositely wound loops and mounted to and around said one of the input shaft and the output shaft, said receiving coil being positioned within the electromagnetic field from said CR coil,
   an electrically conductive coupler having lobes corresponding in number to the number of oppositely wound loops of said receiving coil mounted to the other of the input shaft and the output shaft, said coupler overlying said receiving coil so that a voltage output from said receiving coil varies as a function of the angular position of said coupler relative to said receiving coil,
   an output circuit mounted on said one of said input shaft and output shaft and powered by said power circuit, said output circuit receiving the voltage signal on the receiving coil as an input signal and generating said sensor signal to said CR coil representative of the angle between the input shaft and the output shaft.

3. The sensor as defined in claim 2 where said CR coil comprises a conductive trace on a printed circuit board.

4. The sensor as defined in claim 2 where said RX coil comprises a conductive trace on a printed circuit board.

5. The sensor as defined in claim 2 where said receiving coil comprises a conductive trace on a printed circuit board.

6. The sensor as defined in claim 2 wherein said RX and said receiving coil both comprise conductive traces on a printed circuit board.

7. The sensor as defined in claim 2 wherein said coupler is mounted to the input shaft.

8. The sensor as defined in claim 2 wherein said RX and said receiving coil both comprise conductive traces on a printed circuit board mounted to the output shaft.

9. The sensor as defined in claim 1 and comprising a drive pinion secured to the shaft assembly for rotation therewith and a driven pinion rotatably mounted to said housing, and a counter circuit which generates a counter signal representative of the number and direction of rotation of said driven pinion.

10. The sensor as defined in claim 2 wherein said output signal varies in frequency as a function of the angular position between the input shaft and the output shaft.

\* \* \* \* \*